(No Model.)

F. M. HALL.
HARNESS ATTACHMENT.

No. 419,044. Patented Jan. 7, 1890.

Witnesses.
Robert Emmett
J. A. Rutherford

Inventor.
Franklin M. Hall.
By James L. Norris,
Atty.

UNITED STATES PATENT OFFICE.

FRANKLIN M. HALL, OF FARMER VILLAGE, NEW YORK.

HARNESS ATTACHMENT.

SPECIFICATION forming part of Letters Patent No. 419,044, dated January 7, 1890.

Application filed September 15, 1888. Serial No. 285,470. (No model.)

*To all whom it may concern:*

Be it known that I, FRANKLIN M. HALL, a citizen of the United States, residing at Farmer Village, in the county of Seneca and State of New York, have invented new and useful Improvements in Harness Attachments, of which the following is a specification.

My invention relates to harness attachments for horses, and the purpose thereof is to provide a simple and inexpensive dev*c*e, whereby all attempts to run away, to back, or to other similar misbehavior may be instantly checked by the driver.

It is my purpose also to provide a simple attachment especially adapted to breaking horses or managing or subduing animals, whereby complete management may be effected by the use of a single safety-rein.

The invention consists in the several novel features of construction and new combinations of parts, hereinafter fully set forth, and then specifically pointed out and defined in the claim.

Figure 1:
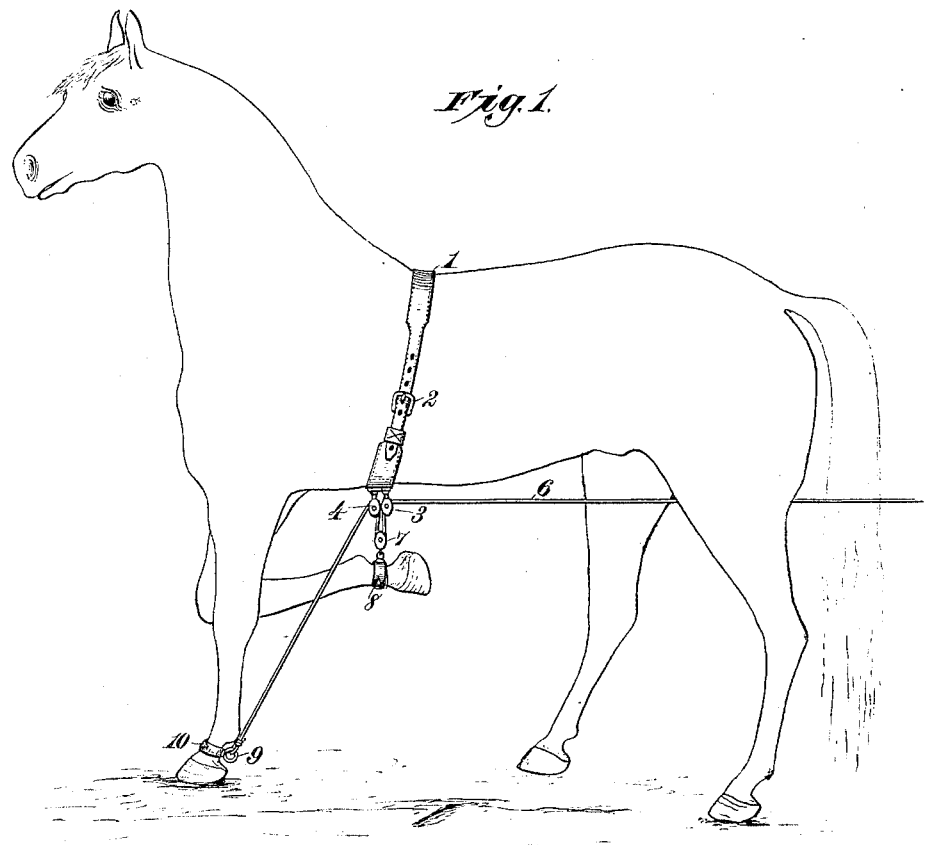
Figure 2:
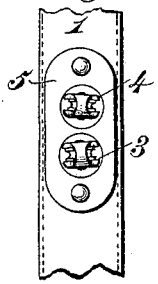

In the accompanying drawings, Figure 1 is a side elevation illustrating my invention. Fig. 2 is a detail view illustrating a slight modification.

In the said drawings, the reference-numeral 1 designates a surcingle of any suitable construction having the usual fastening-buckle 2, by which it is applied to the animal behind the shoulders. Mounted upon the girth in such manner that they lie about in the median line of the body are two pulleys or sheaves 3 and 4, their axes being nearly transverse to the length of the body. The bearings in which these pulleys are supported are preferably mounted upon a strong metallic plate 5, of suitable width and length, securely riveted to the girth.

Passing over the pulley 3 is a safety-rein 6, which may be carried upon the side of the animal or led between the hind legs. From the pulley 3 this strap is carried down and over a pulley 7, which is linked by an eye to a strap 8, buckled about the pastern of the right fore leg. From the pulley 7 the strap passes upward and over the second pulley 4 on the girth, and thence downward to an eye or ring 9, attached to a strap 10, buckled about the pastern-joint of the left fore leg. The rear end of the safety-rein 6 is held in the hand of the driver.

The operation of the invention is as follows: Under ordinary circumstances the rein is simply held with a light tension, only sufficient to keep the strap from fouling with the fore legs; but upon indications of fright, bad temper, or other misbehavior a comparatively light pull upon the rein will instantly draw up one of the fore feet, the rein acting upon the leg which is at the moment off the ground, retaining it in the position shown in the drawings, and completely disabling the animal at the pleasure of the driver.

The application of a similar method in the breaking and training of horses is already known; but by my invention I provide simple means, whereby either or both fore feet are brought under complete control by the use of a single safety-rein only.

It will readily be seen that by my invention the animal may be thrown upon its knees, and finally upon its side, if desired, by the use of a single strap or rein only, which also serves to control the animal in the manner set forth.

In Fig. 2 I have shown a modification in which the pulleys 3 and 4 are placed transversely to the length of the animal, instead of parallel therewith; but both constructions are equally well adapted for the purposes of my invention.

I am aware that a device for controlling horses consisting of a single line fastened to a ring on the surcingle, passing thence through a series of pulleys, to which are attached straps provided with rings adapted to slip on the straps and form a noose for the reception of the ankles of the animal, and thence to the driver, is old, and I do not therefore claim the same. My invention differs therefrom in attaching the end of a single rein directly to one fore leg of the animal, thus dispensing with the numerous pulleys, whereby a more simple, cheaper, and more efficient device is produced.

What I claim is—

In combination with the surcingle 1, having two pulleys 3 and 4, and the pastern-strap 8, having a pulley 7, the pastern-strap 10, having the eye 9, and the rein 6, having one extremity attached directly to the said eye of the pastern-strap 10, passing around the pulleys 4, 7, and 3, and adapted to extend back between the rear legs of an animal, substantially as described.

In testimony whereof I affix my signature in presence of two witnesses.

FRANKLIN M. HALL.

Witnesses:
J. R. WHEELER,
R. P. COLLVER.